Feb. 12, 1924.
J. F. BALDAUF
GREASE GUN
Filed April 10, 1922
1,483,268
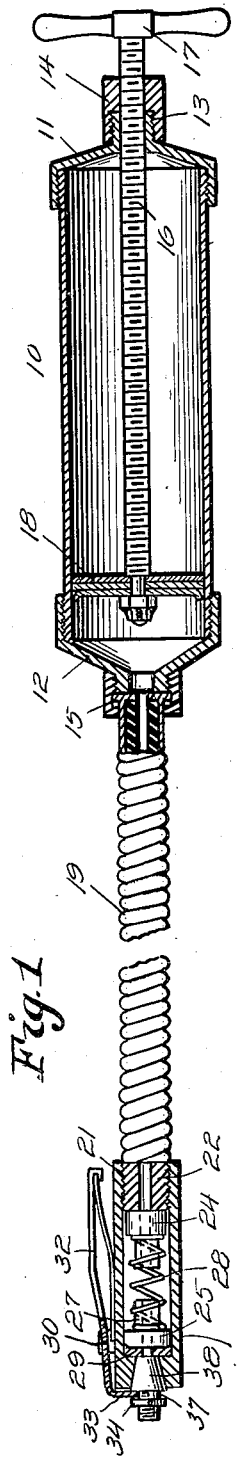
J. F. Baldauf  INVENTOR.
BY Geo. P. Kimmel
ATTORNEY.

Patented Feb. 12, 1924.

1,483,268

UNITED STATES PATENT OFFICE.

JOHN F. BALDAUF, OF CASPER, WYOMING.

GREASE GUN.

Application filed April 10, 1922. Serial No. 551,224.

*To all whom it may concern:*

Be it known that I, JOHN F. BALDAUF, a citizen of the United States, residing at Casper, in the county of Natrona and State of Wyoming, have invented certain new and useful Improvements in Grease Guns, of which the following is a specification.

The invention relates to a grease gun and more particularly to the class of plunger operating pressure grease guns.

The primary object of the invention is the provision of a grease gun of this character, wherein the cylinder thereof has working in the same a plunger to exert pressure upon the grease or lubricant held within said cylinder so that the grease or lubricant can be forced through a conduit or feed tube into a grease cup or other place of deposit, the feed tube or conduit being fitted with a novel form of coupling so that the grease or lubricant can pass into a grease cup or other place of deposit without possibility of the backflow of the grease or lubricant.

Another object of the invention is the provision of a grease gun of this character, wherein the coupling for connecting the feed tube of the gun with a grease cup or the like, can be detachably locked to said cup or the like and when coupled will avoid any possibility of leakage of grease or lubricant delivered from the gun into the cup or like.

A further object of the invention is the provision of a grease gun of this character, wherein the coupling for the feed tube having the latch, or latches, for the fastening of said coupling in position for the dispensing of grease or lubricant into a grease cup or the like is of novel form and the latch, or latches, being so disposed thereon that they can be conveniently operated by the user of the gun and when the coupling is engaged with a grease cup or the like, it will be unnecessary for the holding of the coupling in position by the hand of the user of the gun.

A still further object of the invention is the provision of a grease gun of this character, which is extremely simple in construction, thoroughly reliable and efficient in its purpose and inexpensive to manufacture.

With these and other objects in view, the invention consists in the features of construction, combination and arrangement of parts, as will be hereinafter fully described, illustrated in the accompanying drawings and pointed out in the claims hereunto appended.

In the accompanying drawings:—

Fig. 1 is an elevation of a grease gun, constructed in accordance with the invention, the same being broken away at the cylinder and coupling portions thereof to illustrate detailed adjunct parts, Fig. 2 is an enlarged, vertical, longitudinal sectional view through the coupling, Fig. 3 is an end elevation thereof, Fig. 4 is a side elevation of the coupling showing a modified arrangement of latches, Fig. 5 is an elevation of a union for the engagement of the coupling therewith.

Similar reference characters indicate corresponding parts throughout the several views in the drawing.

Referring to the drawing in detail, the grease gun comprises a cylindrical barrel 10, preferably made from metal tubing having externally threaded opposite ends for detachable connection therewith of top and bottom caps or heads, 11 and 12, respectively, each being formed with a centrally bored externally threaded nipple 13 having detachably engaged thereon, packing glands 14 and 15 respectively. Working through and in threaded engagement with the gland 14 is a screw plunger 16 having a cross handle 17 at its outer end. This plunger 16 at its inner end is fitted with a piston 18 working within the barrel 10, so that when the barrel is filled with grease or lubricant, the latter will be forced out of the same by the piston 18 through the other nipple 13 at the bottom cap or head 12, the packing gland 15 being of a construction when engaged with said nipple 13 to fasten thereto one end of a flexible or rigid feed tube 19 which carries at its outer opposite end a coupling hereinafter fully described.

The coupling comprises a tubular body 20 having one terminal portion thereof internally threaded as at 21, for detachable engagement with the peripherally threaded nipple 22 at the outer end of the feed tube 19. The other end terminal portion of said body 20 is enlarged to form a shoulder 20' and to further form a conoidal shaped socket 23 to receive and frictionally engage the conoidal shaped end portion of a union to be presently referred to.

Working within the tubular body 20 are followers 24 and 25 respectively, the same being centrally bored at 26 and are reduced at their inner ends to form necks 27 about which are engaged the ends of a coiled expansion spring 28 which serves to spread apart the followers 24 and 25, whereby the latter follower, namely, 25, plays against a fibrous washer valve 29 to sustain the same firmly seated against the shoulder 20' and also against the union hereinafter described for a purpose that will be described subsequently. The follower 24 is seated against the nipple end 22 of the flexible tube 19 so that grease or lubricant passing from the latter will work directly through the bore in said follower 24 and likewise through the bore in the follower 25 into the said union.

Formed exteriorly in the body 20 are spaced ears 30 for supporting a pivot 31 hinging to said body a lever operated latch 32, the latter being formed with a notched jaw 33 for detachably locking the body 20 to the union hereinafter described.

The union comprises a nipple 34 having a conical head 35 containing therein a spring seated ball valve 36, the said nipple 34 at its opposite end being threaded for detachable engagement in a part to be lubricated and the conical head 35 is adapted to be received in the socket 23 in the coupling. The nipple 34 is formed with an annular groove 37, which is adapted to engage the jaw 33 on the tubular body 20 of the coupling for the locking of the union and the coupling together as is clearly shown in Fig. 1 of the drawing. The follower 25 playing upon the fibrous washer valve 29 sustains it in contact with the conical head 35 of the union so as to avoid any possibility of leakage of grease or lubricant delivered through the coupling between said conical head 35 of the union and the wall of the socket of the coupling.

In Fig. 4 there is shown a slight modification of a coupling, wherein the body 38 thereof carries at opposite sides lever operated latches 39, each identical to the latch 32 hereinbefore described, and these latches are held, and likewise the latch 32, in positive engaged position through the medium of leaf springs 40 as is clearly shown in Figs. 2 and 4 of the drawing.

From the foregoing, it is thought that the construction and manner of operation of the grease gun will be clearly understood, and, therefore, a more extended explanation has been omitted It may be further added that the plunger 16 is in screw threaded engagement with the gland 14 only passing freely through the nipple 13. By removing the cap 12 and loosening the gland 14 from the nipple 13 the plunger may be drawn back and forth with a single stroke to draw lubricant into the barrel 10.

The flexible feed tube 19 may be replaced by a non-flexible or rigid tube with a universal joint in it if so desired.

What is claimed is:—

1. A grease gun comprising a pump cylinder, a conduit connected to and leading therefrom, a tubular body having one end terminal portion connected with and extended from the outer end of said conduit and further having its other end terminal portion enlarged to provide a shoulder and a conoidal shaped socket, an apertured valve disk seating against said shoulder, a pair of opposed centrally bored oppositely shiftable spring controlled followers arranged in said body and each having a reduced portion, one of said followers bearing against said disk to maintain it seated against said shoulder, an expansible and contractable element mounted on the reduced portions of said followers and providing means for shifting them in opposite directions, and means carried by said body for securing a union in said socket.

2. In combination, a tubular body adapted to be connected with a pump cylinder and provided with an enlarged end terminal portion to form a conoidal shaped socket and a shoulder, a spring controlled apertured valve disk seated against said shoulder, a hollow union comprising a conoidal shaped portion seating in said socket and formed with a bore, said union having a spring controlled globular valve arranged in said bore and further provided with a peripheral groove, and means carried by said body and engaging in said groove for connecting the union to said body whereby said valve will normally close the aperture in said disk.

March 30, 1922.

In testimony whereof, I affix my signature hereto.

JOHN F. BALDAUF.